US 7,644,396 B2

(12) United States Patent
Cohen

(10) Patent No.: US 7,644,396 B2
(45) Date of Patent: Jan. 5, 2010

(54) OPTIMAL PROGRAM EXECUTION REPLAY AND BREAKPOINTS

(75) Inventor: Ernest S. Cohen, Wyncote, PA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 11/288,520

(22) Filed: Nov. 29, 2005

(65) Prior Publication Data

US 2007/0168995 A1 Jul. 19, 2007

(51) Int. Cl.
*G06F 9/44* (2006.01)
*G06F 9/45* (2006.01)
(52) U.S. Cl. ........................ 717/129; 717/127; 717/128
(58) Field of Classification Search ................. 717/100, 717/124–132, 141–144, 151
See application file for complete search history.

(56) References Cited

U.S. PATENT DOCUMENTS

| 5,265,254 | A | * | 11/1993 | Blasciak et al. | 717/130 |
|---|---|---|---|---|---|
| 5,394,547 | A | | 2/1995 | Correnti et al. | 395/650 |
| 5,446,900 | A | * | 8/1995 | Kimelman | 717/124 |
| 5,720,009 | A | | 2/1998 | Kirk et al. | 395/64 |
| 5,764,989 | A | * | 6/1998 | Gustafsson et al. | 717/129 |
| 5,838,975 | A | * | 11/1998 | Abramson et al. | 717/129 |
| 6,009,269 | A | | 12/1999 | Burrows et al. | 395/704 |
| 6,028,999 | A | * | 2/2000 | Pazel | 717/134 |
| 6,044,219 | A | * | 3/2000 | Lips | 717/106 |
| 6,178,394 | B1 | | 1/2001 | Godefroid | 703/17 |
| 6,263,491 | B1 | * | 7/2001 | Hunt | 717/130 |
| 6,401,103 | B1 | | 6/2002 | Ho et al. | 707/201 |
| 6,405,326 | B1 | | 6/2002 | Azagury et al. | 714/38 |
| 6,640,251 | B1 | | 10/2003 | Wiget et al. | 709/238 |
| 6,715,139 | B1 | * | 3/2004 | Kodosky et al. | 717/125 |
| 6,721,941 | B1 | * | 4/2004 | Morshed et al. | 717/127 |
| 6,728,954 | B1 | * | 4/2004 | Kesselman et al. | 717/154 |
| 6,807,583 | B2 | * | 10/2004 | Hrischuk et al. | 719/318 |
| 6,885,983 | B1 | | 4/2005 | Ho et al. | 703/14 |
| 6,954,923 | B1 | * | 10/2005 | Yates et al. | 717/130 |
| 6,957,422 | B2 | * | 10/2005 | Hunt | 717/130 |
| 7,058,928 | B2 | * | 6/2006 | Wygodny et al. | 717/128 |
| 7,069,544 | B1 | * | 6/2006 | Thekkath | 717/128 |
| 7,080,365 | B2 | * | 7/2006 | Broughton et al. | 717/146 |
| 7,185,321 | B1 | * | 2/2007 | Roe et al. | 717/134 |

(Continued)

FOREIGN PATENT DOCUMENTS

EP 0 685 792 A1 12/1995

OTHER PUBLICATIONS

Koch et al, "Breakpoints and breakpoint detection in source level emulation", IEEE, pp. 26-31, 1996.*

(Continued)

*Primary Examiner*—Anil Khatri
(74) *Attorney, Agent, or Firm*—Woodcock Washburn LLP

(57) ABSTRACT

A method of replaying a recorded sequence of execution steps of a computer program or system to a selected target step while taking a minimal number of execution breaks includes calculating, for each of the steps, a predecessor step that can be reached in a minimal number of execution breaks. The total calculation time for the entire execution is linear in the number of steps, and allows subsequent calculation of an optimal path to any selected step to be obtained in time linear in the length of the optimal path.

12 Claims, 3 Drawing Sheets

U.S. PATENT DOCUMENTS

| | | | |
|---|---|---|---|
| 7,254,806 B1 * | 8/2007 | Yates et al. | 717/136 |
| 2003/0182278 A1 | 9/2003 | Valk | 707/3 |
| 2004/0078674 A1 | 4/2004 | Raimi et al. | 714/33 |
| 2005/0076043 A1 | 4/2005 | Benedetti et al. | 707/100 |

OTHER PUBLICATIONS

Chern et al, "Debugging with control flow breakpoints", ACM AOSD, pp. 96-106, 2007.*

Iqbal et al, "Understanding and developing models for detecting and differentiating breakpoints during interactive tasks", ACM CHI pp. 697-706, 2007.*

Camera et al, "An integrated debugging environment for FPGA computing platforms", IEEE, pp. 311-316, 2008.*

Schliep et al, "Efficient algorithms for the computational design of optimal tiling arrays", IEEE, pp. 557-567, 2008.*

Zhang et al, "Dynamic slicing long running programs through execution fast forwarding", ACM SIGSOFT, pp. 81-91, 2006.*

Flanagan, C. et al., "Dynamic Partial-Order Reduction for Model Checking Software", *POPL*, 2005, 110-121.

"Model Checking", http://www.dsic.upv.es/~villanue/research.html, 6 pages.

Wang, W. et al., "E-Process Design and Assurance using Model Checking", *Computer*, 2000, 48-53, http://crec.mccombs.utexas.edu/works/articles/IEEE-Wenli.pdf.

"Model Checking Techniques for Timed Systems", http://www.iitg.ac.in/engfac/jatin/public_html/Jkthesis/node27.html, 2 pages.

Falaschi, M. et al., "Automatic Verification of Timed Concurrent Constraint Programs", May 11, 2005, arXiv:cs.LO/0505026 v1, 37 pages.

Nicolescu, B. et al. "Validating a Dynamic Signature Monitoring Approach Using the LTL Model Checking Technique", 2005, http://www-etud.iro.umontreal.ca/~gorsen/research/papers/gorse-05.pdf, 4 pages.

"Model Checking for Mobility", The University of Liverpool, the Faculty of Science/Computer Science Department, Accessed via the Internet on Apr. 1, 2006 at URL <http://csc.liv.ac.uk/research/logics/MCM>, 3 pages.

Clarke, E. et al., "Bounded Model Checking Using Satisfiability Solving", 2001, <http://www.inf.ethz.ch/personal/biere/papers/ClarkeBiereRaimiZhu-FMSD2001.pdf>, 20 pages.

Chen, H. et al., "Model Checking One Million Lines of C Code", 2004, <http://www.cs.ucdavis.edu/~hchen/paper/ndss04.pdf>, 15 pages.

* cited by examiner

| Step (i) | Variable | l(i) | d(i) | p[i] |
|---|---|---|---|---|
| 0 | - | - | 0 | Undefined |
| 1 | X | 0 | 1 | 0 |
| 2 | X | 1 | 2 | 1 |
| 3 | X | 2 | 3 | 2 |
| 4 | Y | 0 | 1 | 0 |
| 5 | X | 3 | 2 | 4 |

Fig. 1

# OPTIMAL PROGRAM EXECUTION REPLAY AND BREAKPOINTS

BACKGROUND

When analyzing or debugging a computer program or system, it is often necessary to restore the system to a state that it was in at an earlier point in time, typically to examine that state or to change the subsequent behavior of the system. Two examples of diagnostic techniques that use this capability are backwards debugging and stateless search.

There are several well-known methods for representing and restoring system states. One method is to explicitly save entire states (or those parts of the state that are modified later in the execution). This makes restoration of the state relatively cheap, but each saved state requires substantial time to record and memory space to store. A second method is to record the steps of the execution and how to undo each, and to restore the system to a previous target state by undoing all intervening steps in reverse order. This makes restoration easy if the target state is not many steps from the current state. However, gathering and storing the required information about each step is relatively expensive, and restoring states from the distant past is inefficient. A third method is to represent a state by the computation needed to bring the program to that state. For example, a state of a deterministic sequential program can be represented by the initial program state and the number of steps that have been executed to arrive at that state; for a concurrent or nondeterministic program, representing a state also requires recording all of the scheduling choices or nondeterministic choices made along the way. The process of re-executing the program from an initial execution state to a desired target state is called replaying the execution.

The replay approach has several advantages. It requires gathering and storing only an initial state and relatively little information about the execution. However, a disadvantage of the replay approach is that replaying a long execution can take substantial time. It is therefore important to make the replay as efficient as possible. One partial mitigation is to periodically checkpoint the state, and to replay the execution from the latest checkpoint; in this case, more efficient replay allows these checkpoints to be taken less often.

The main challenge in efficient replay is stopping the execution precisely at the desired target step. The usual way to do this is to use preexisting facilities that allow the program to be interrupted when certain configurable conditions arise. For example, some CPUs allow program execution to be "single-stepped", causing execution to "break" into a monitor after every step of the execution. Unfortunately, each break into the monitor is expensive in terms of execution time and so it is important to minimize the number of interrupts taken during replay. Thus, the simplest solution to the replay problem, single-stepping the program for an appropriate number of instructions, is usually too inefficient.

An alternative is to set more specific breakpoints, causing execution to break into the monitor on more specific conditions. For example, some CPUs provide hardware breakpoints that cause execution to break when a specified memory location or I/O port is used for a specified operation such as a read, write, or instruction fetch. A more efficient alternative to single stepping is to set a breakpoint either on the code of the target step or on data accessed by the target step. But, if the target step is in a tight loop, or if it manipulates frequently accessed data, the replay may still take many interrupts before arriving at the target step.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect of the invention, an execution is preprocessed for subsequent replay by calculating two arrays, as follows. The first array gives, for every target step of the execution, the earliest step of the execution for which there is some breakpoint setting that will cause execution starting at the earlier step to next break at the target step. The second array gives, for each target step of the execution, an "optimal predecessor" step of the execution that is both reachable in a shorter sequence of breaks than the target step and can reach the target step in a single break. Both arrays can be calculated in time linear in the length of the execution. Finally, an optimal sequence of breakpoint settings to take control from the initial step to a target step other than the initial step is given by calculating the optimal sequence of breakpoint settings to get from the initial step to the optimal predecessor of the target step (as given in the second array), followed by a single additional breakpoint setting to get from the optimal predecessor to the target step.

BRIEF DESCRIPTION OF THE DRAWINGS

In the drawings:

FIG. 1 is an example table of values for an array calculated using aspects of the invention;

DETAILED DESCRIPTION

Exemplary Embodiments

Figure 2:
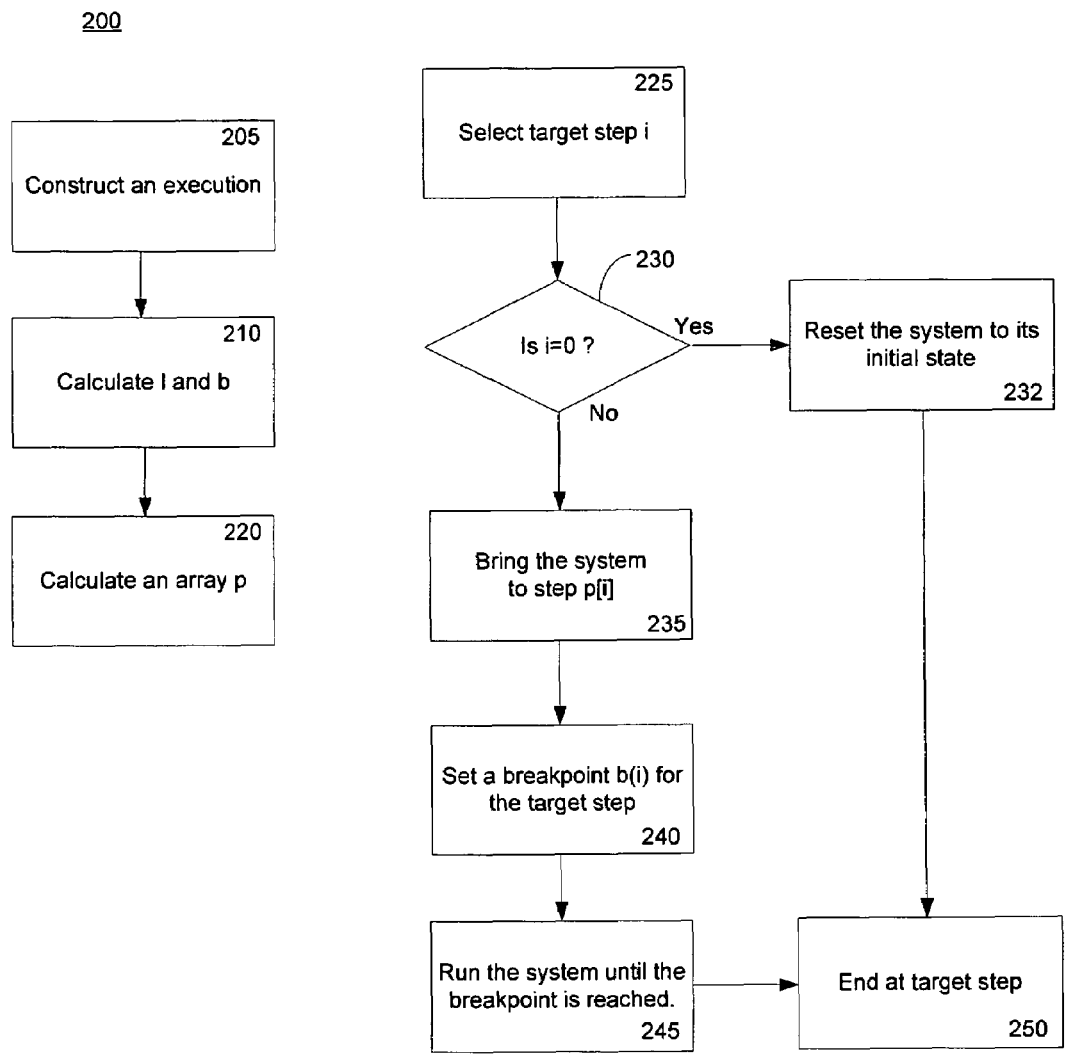
FIG. 2 depicts an example flow diagram having aspects of the invention.

One possible improvement to the concept of setting breakpoints in a system to replay to a particular state is to change breakpoint settings dynamically during replay. For example, if the target step is in a tight loop, it might be more efficient to first set a breakpoint on a step that occurs less often than the target step, and switch to a breakpoint on the target step only when execution approaches the target step.

One aspect of the present invention is to compute, given suitable information recorded from an execution, an optimal strategy for dynamically changing breakpoints, or control mechanisms with equivalent functionality, to replay the execution to a desired target step. The calculated strategy is optimal in the sense that no other dynamic strategy of the same kind can result in fewer program breaks. The invention requires preprocessing time that is linear in the length of the recorded part of the execution, and for each execution replay, requires time linear in the length of the minimal-length breakpoint strategy generated for that replay. It is thus also optimal in terms of computational effort.

According to an aspect of the current invention, the first step in the construction of an optimal breakpoint strategy is to construct a suitable array of length N (hereafter referred to as "the breakpoint array"), where the i'th element of the array includes a number l(i), where $0 \leq l(i) < i$, and a breakpoint condition b(i). Each element of the array represents a step of the execution to be replayed; not all steps of the execution have to be so represented, but only represented steps are used as targets for breakpoints. (The 0'th entry of the breakpoint array can be viewed as a "dummy" step, representing the start of the execution; its value is irrelevant.) The values chosen for l(i) and b(i) must satisfy the following condition: for every i, $0<i<N$, when the execution is started just before $l(i)^1$th step, with a breakpoint set according to b(i), the execution will next break just before the i'th step. A break may be interpreted as the cessation of program execution at a selected point (breakpoint) in the program. For optimal behavior, each l(i) should be as small as possible, but in some embodiments, it may be worthwhile to sacrifice some precision in the calculation of l to make the computation faster, or to allow fewer steps to be represented in the breakpoint array.

A suitable breakpoint array can be constructed in several ways. In one embodiment of the invention, the program is single-stepped, and a dictionary data structure, such as a hash table, is used to store, for each breakpoint setting that would cause a break for a previous step of the execution, the latest previous step at which the setting would cause such a break. After the i'th program step, each breakpoint setting that would cause a break at step i is looked up in the dictionary. If any of these breakpoint settings is not in the dictionary, l(i) is set to 0 and b(i) is set to a breakpoint setting not in the dictionary; otherwise, b(i) is set to the breakpoint setting with minimum lookup value, and l(i) set to the corresponding lookup value. Also, for each of the looked-up breakpoint settings, the dictionary value for that setting is set to i. In another embodiment, a set of suitable candidate breakpoint settings (e.g., accesses to a chosen set of memory locations) is chosen in advance, and the program is run with breaks taken on all such breakpoints, with calculations done as above. This embodiment can result in shorter breakpoint arrays, at the cost of less optimal breakpoint path calculations. In another embodiment, elements of b are sequences of breakpoint settings, rather than individual breakpoints settings, allowing a hierarchical calculation of breakpoint settings. Other embodiments may be devised by those skilled in the art.

Given a suitable breakpoint array, the calculation of an optimal breakpoint strategy can be expressed as the following problem. For each i, $0<i<N$, let d(i) be the minimal number of program breaks needed to stop execution just before the i'th step d(i) can be defined recursively as follows: d(0)=0, and for $0<i<N$, d(i) is one more than the minimum of d(j), where j ranges over $l(i) \leq j < i$. An optimal strategy is given by an array p of length N, where, for i>0, $l(i) < p[i] < i$, and $d(i)=d(p[i])+1$. That is, p[i] specifies a step of the execution that is reachable in exactly one fewer breaks than the i'th step, and which can reach the i'th step in a single break. Given such an array p, an optimal sequence of breakpoint settings to get to step i is given as follows:

if i=0, the sequence is empty if i>0, the last breakpoint setting of the sequence is b(i), and the preceding breakpoint sequence is the optimal breakpoint sequence to get to p[i]

One naive method to compute a suitable p is to calculate d and p together, using an algorithm like the following (given in the C programming language)

```
d[0] = 0;
for (int i = 1; i < N; i++) {
    d[i] = infinity;
    for (int j = l(i); j < i; j++)
        if (d[j] + 1 < d[i] ) {
            d[i] = d[j] + 1;
            p[i] = j;
        }
}
```

But, this algorithm can, in the worst case, require the computation time quadratic in N. Similarly, phrasing the problem as a shortest path problem yields an algorithm that is quadratic in N. One aspect of the present invention includes using an algorithm that is linear in N. In the present invention, the array p is calculated with the following algorithm (given in the C programming language):

for ($i=1; i<N; i++$)

for ($p[i]=i-1; (p[i]>0)$ && $(l(i)<=p[p[i]]); p[i]=p[p[i]]$);

Here, the computation of a predecessor array p requires execution time linear in N. Explicit calculation of d is not necessary.

Figure 1:
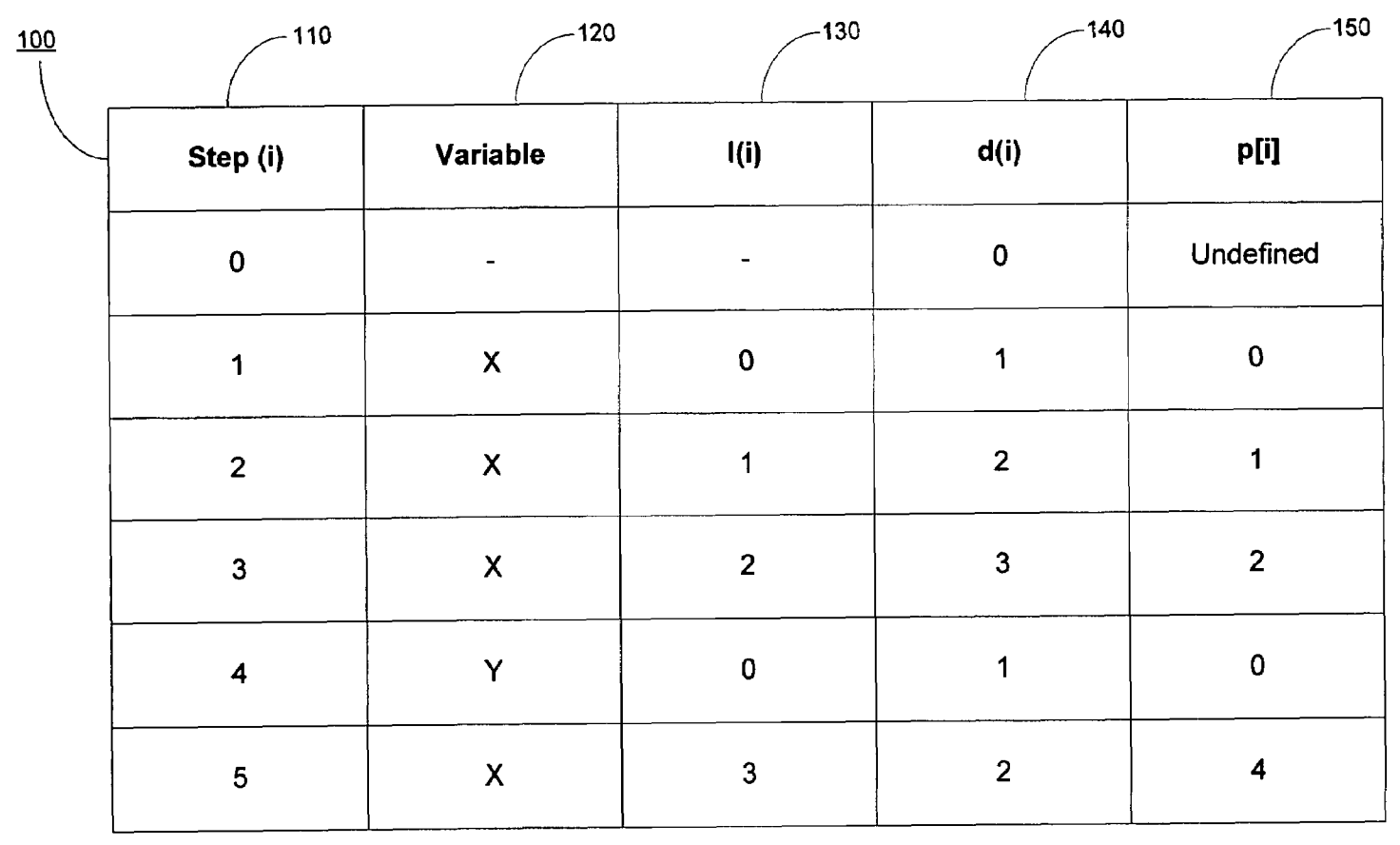

FIG. 1 is an example using the above algorithm in the calculation of an array p[i] useful to replay a software system to a particular step. The table 100 of FIG. 1 depicts example values calculated using the algorithm for a six step execution having steps i as in column 110. In this example, the breakpoints are set on program variables and the variable accessed at each step is given in column 120. Thus, in this example b(i) can be interpreted as breaking on the variable given for the i'th step.

Values for l(i) in column 130 of FIG. 1 may be precalculated. As noted above, l(i) (the earliest breakpoint for step i) is the earliest step of the execution from which the i'th step in one breakpoint. For example, l(3)=2 because starting at step 2 and breaking on X would cause a break at step 3, but starting at step 1 and breaking on X would cause a break at step 2. Similarly, l(4)=0 because starting at step 0 and breaking on Y would cause execution to break on step 4. Likewise, l(5)=3 because a breakpoint on variable X would cause execution started at step 3 to next break at step 5.

Values for d(i) in column 140 of FIG. 1 are provided only for illustration, since d is used only to describe the requirements of the algorithm employed. As noted above, d(i) is the smallest number of breaks needed to get to step i, starting from step 0. For example, d(3)=3 because the only way to get to step 3 is to break three times successively on variable X, while d(4)=1 because breaking on Y takes only one step to get from step 0 to step 4, and d(5)=2 because one can first break once on variable Y (breaking at step 4) and then break on variable X to get to step 5 in two breaks.

Once the values of l(i) are calculated, then the values of the array p[i] may be calculated using the above algorithm; these values are given in column 150. The array p may then be used to choose an optimal sequence of breakpoint settings to bring the system to any desired step as described above. For example, to bring the system to step 5, the system is first brought to step 4, then execution is continued with a breakpoint on X. To bring the system to step 4, the system is first brought to step 0, then execution is continued with a breakpoint on Y. To bring the system to step 0, the system is simply initialized. Thus, the complete calculated strategy to bring the system to step 5 is to reset the state, set a breakpoint on Y, run the system until it hits a breakpoint (at step 4), reset the breakpoint settings to break on X, and run the system until it hits a breakpoint (at step 5).

FIG. 2 depicts an example method 200 according to aspects of the invention. Steps 205 through 220 represent a preprocessing flow; steps 225 to 250 are subsequently used to bring the system to a desired step.

Initially, an execution trace of length N is constructed (step 205). As described above, this trace may be constructed by single-stepping the system, or by breaking on selected conditions. The breakpoint array, including l(i) and b(i), is then calculated (step 210), l(i) being the earliest step into the trace where step i is only one breakpoint away, and b(i) is the corresponding breakpoint setting. Next, the array p is calculated (step 220); p(i) provides an optimal point at which to take the last break before breaking at the i'th step.

To use the array p, a target step is selected from the trace (step 225). The target step is a specific i'th step which may be selected either under program control or via a user interface. If i=0 (step 230), the system is reset to its initial state (step 232) and the process ends (step 250). Otherwise, the system is (recursively) first brought to the p[i]'th step (step 235), the breakpoint is then set according to b(i), unsetting any previously set breakpoints (step 240), and the system is resumed. According to an aspect of the invention, the system will then break at the i'th step (step 250). The process from step 225 to 250 may be repeated as often as needed with different selections of target (i'th) step.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 3:
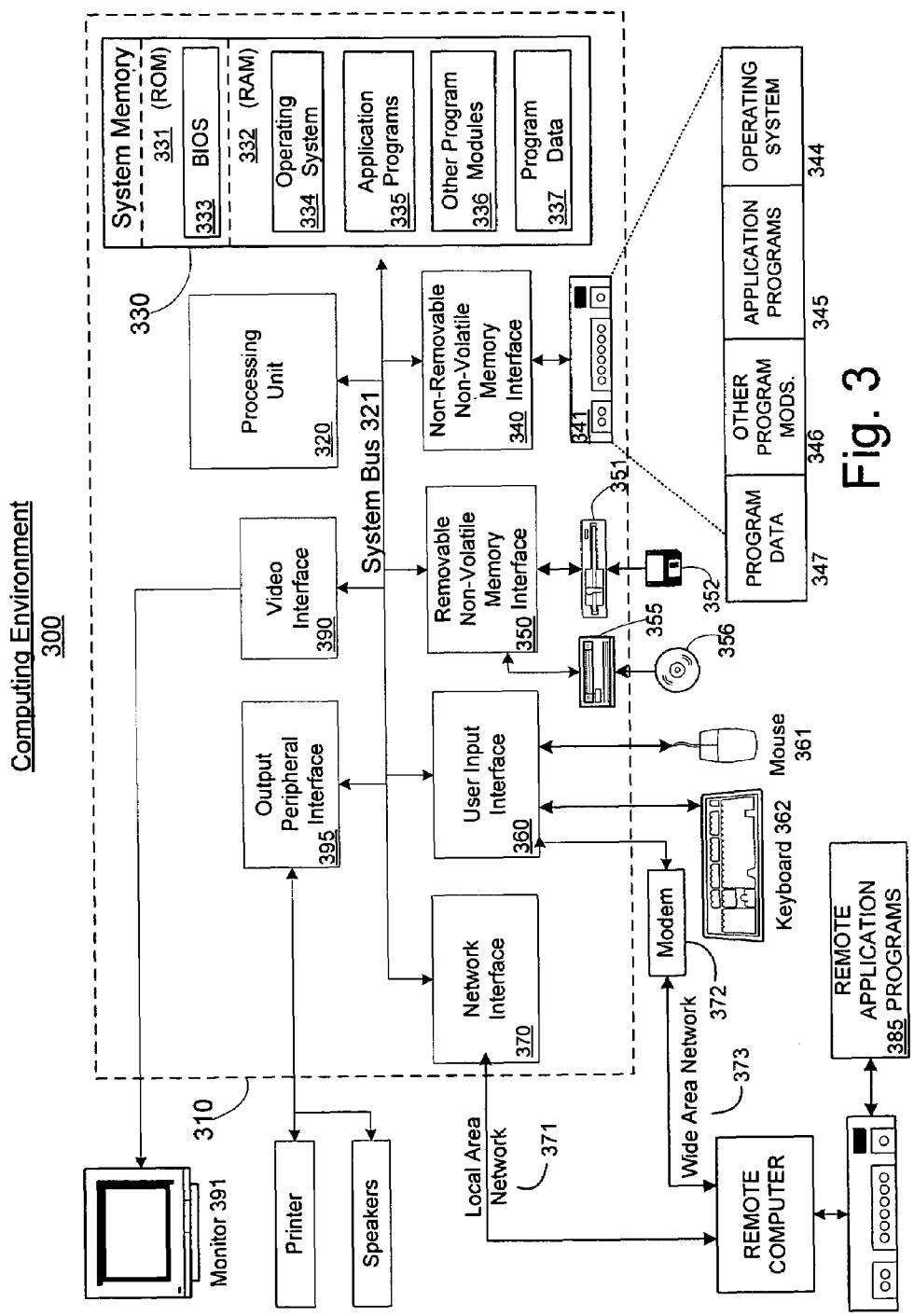
FIG. 3 is a block diagram showing an example computing environment in which aspects of the invention may be implemented.

FIG. 3 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 3, an exemplary system for implementing an embodiment of the invention includes a general purpose computing device in the form of a computer system 310. Components of computer system 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures.

Computer system 310 typically includes a variety of computer readable media. Computer readable media can be any available media that can be accessed by computer system 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer system 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 333, application programs 335, other program modules 336, and program data 337.

The computer system 310 may also include other removable/non-removable, volatile/nonvolatile computer storage media. By way of example only, FIG. 3 illustrates a hard disk drive 331 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 331 is typically connected to the system bus 321 through a non-removable memory interface such as interface 330, and magnetic disk drive 351 and optical disk drive 355 are typically connected to the system bus 321 by a removable memory interface, such as interface 350.

The drives and their associated computer storage media discussed above and illustrated in FIG. 3 provide storage of computer readable instructions, data structures, program modules and other data for the computer system 310. In FIG. 3, for example, hard disk drive 331 is illustrated as storing operating system 333, application programs 335, other program modules 336, and program data 337. Note that these components can either be the same as or different from operating system 333, application programs 335, other program modules 336, and program data 337. Operating system 333, application programs 335, other program modules 336, and program data 337 are given different numbers here to illustrate that, at a minimum, they are different copies. A user may enter commands and information into the computer system 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390, which may in turn communicate with video memory (not shown). In addition to monitor 391, computer systems may also include other peripheral output devices such as speakers 397 and printer 396, which may be connected through an output peripheral interface 395.

The computer system 310 may operate in a networked or distributed environment using logical connections to one or more remote computers, such as a remote computer 380. The remote computer 380 may be a personal computer, a server, a router, a network PC, a peer device or other common network node, and typically includes many or all of the elements described above relative to the computer system 310, although only a memory storage device 381 has been illustrated in FIG. 3. The logical connections depicted in FIG. 3 include a local area network (LAN) 371 and a wide area network (WAN) 373, but may also include other networks/buses. Such networking environments are commonplace in homes, offices, enterprise-wide computer networks, intranets and the Internet.

When used in a LAN networking environment, the computer system 310 is connected to the LAN 371 through a network interface or adapter 370. When used in a WAN networking environment, the computer system 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer system 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a concurrent system execution replay method. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method for replaying a computer program execution up to a target step of the execution other than the initial step of the execution, the method comprising:

the computer precalculating a breakpoint array including an earliest predecessor step of the execution for each of a plurality of target steps, the earliest predecessor step being a step for which some breakpoint setting causes execution staffed at the earliest predecessor step to next break at a corresponding target step, and precalculating an earliest breakpoint setting that causes the execution staffed at the earliest predecessor step to cause the execution to next break at the target step;

the computer calculating an optimal predecessor step of the target step, the predecessor step preceding the target step and from which the target step can be reached in a single break, wherein the program execution can be replayed to the predecessor step in a minimal number of breaks;

resetting the program execution to an initial state;

the computer replaying the program execution to the predecessor step;

the computer unsetting any breakpoints that would cause the program execution to break before the target step;

the computer setting a breakpoint that will cause the program execution to next break at the target step by setting the breakpoint to the earliest breakpoint setting of the target step; and the computer running the program execution to its next break, wherein the program execution stops at the target step.

2. The method of claim 1, wherein the calculating of an optimal predecessor step of the target step comprises:

the computer setting a candidate optimal predecessor step to the step immediately preceding the target step;

the computer repeatedly testing whether: (a) the candidate step is not an initial state, and (b) the target step is reachable in a single break from the optimal predecessor of the candidate step;

if (a) and (b) are true, the computer setting the candidate step to the optimal predecessor of the candidate step; and if either (a) or (b) is false, the computer setting the optimal predecessor of the target step to be the candidate step.

3. The method of claim 2, wherein the method further comprises the steps of:

the computer determining whether the target step is reachable in a single break from the optimal predecessor step of the candidate step is completed by testing whether the optimal predecessor of the candidate step does not precede the earliest predecessor of the target step.

4. The method of claim 3, wherein precalculating the earliest predecessor step and the earliest breakpoint setting are performed by the computer by maintaining a table mapping breakpoint settings to steps of the execution, the table initially set to the empty table, and a current step, initially set to the initial step of the execution, and by repeatedly:

calculating a set of breakpoint settings that would cause execution to break at the current step;

for each breakpoint setting in the set of breakpoint settings, looking up the breakpoint setting in the table;

if the table maps the breakpoint setting to an earlier step that precedes the earliest predecessor of the current step, setting the earliest predecessor of the current step to be the earlier step, and setting the earliest breakpoint setting of the current step to be the breakpoint setting;

modifying the table to map the breakpoint setting to the current step; and completing the precalculating step if the current step is the last step of the execution, and otherwise setting the current step to be the step of the execution that immediately follows the current step.

5. A computer system for replaying an execution of a computer program to a target step, the system comprising:

a central processing unit programmed to set a breakpoint;

a storage device storing a data structure comprising a precalculated breakpoint array including an earliest predecessor step of an execution for each of a plurality of target steps, the earliest predecessor step being a step for which some breakpoint setting causes execution started at the earliest predecessor step to next break at a corresponding target step, and a precalculated earliest breakpoint setting that causes the execution started at the earliest predecessor to cause the execution to next break at the target step;

a first memory accessible to the central processing unit, the memory comprising an executable program to replay an execution of a computer program; and a second memory comprising a trace of a computer program execution, wherein the first memory comprises instructions which, when executed by the central processing unit, operate on second memory content, the instructions, when executed, causing the central processing unit to perform the functions of:

receiving the selection of the target step, wherein the target step is not an initial step in the program;

calculating an optimal predecessor step of the target step, the predecessor step preceding the target step and from which the target step can be reached in a single break, wherein the program execution can be replayed to the predecessor in a minimal number of breaks;

resetting the program execution to an initial state;

replaying the program execution to the predecessor step;

unsetting any breakpoints that would cause the program execution to break before the target step;

setting a breakpoint that will cause the program execution to next break at the target step, and running the program execution to its next break, wherein the program execution stops at the target step.

6. The computer system of claim 5, further comprising a user interface for receiving the selection of a target step of the computer program execution.

7. The computer system of claim 6, wherein the selected target step has a corresponding breakpoint at which execution of the replay will break.

8. The computer system of claim 6, wherein the central processing unit enters a breakpoint into the computer program, the breakpoint corresponding to the selected step.

9. The computer system of claim 8, wherein the central processing unit configures the computer program to an initial state before replaying the computer program.

10. A computer-readable storage medium having computer-executable instructions stored thereon that when processed by the computer cause the computer to perform a method of replaying a computer program execution to a target step of the execution other than an initial step of the execution, the method comprising:

precalculating a breakpoint array including an earliest predecessor step of the execution for each of a plurality of target steps, the earliest predecessor step being a step for which some breakpoint setting causes execution staffed at the earliest predecessor step to next break at a corresponding target step, and precalculating an earliest breakpoint setting that causes the execution staffed at the earliest predecessor step to cause the execution to next break at the target step;

calculating an optimal predecessor step of the target step by setting a candidate optimal predecessor step to the step immediately preceding the target step and repeatedly testing: (a) whether the candidate step is not an initial state, and (b) whether the target step is reachable in a single break from the optimal predecessor of the candidate step, (c) if (a) and (b) are true, setting the candidate step to the optimal predecessor of the candidate step, and (d) if (a) or (b) are false, setting the optimal predecessor of the target step to be the candidate step, the predecessor step preceding the target step and from which the target step can be reached in a single break, wherein the program execution can be replayed to the predecessor step in a minimal number of breaks;

resetting the program execution to an initial state;

replaying the program execution to the predecessor step;

unsetting any breakpoints that would cause the program execution to break before the target step;

setting a breakpoint that will cause the program execution to next break at the target step, and running the program execution to its next break, wherein the program execution stops at the target step.

11. The computer-readable storage medium of claim 10, wherein the method further comprises the steps of determining whether the target step is reachable in a single break from the optimal predecessor step of the candidate step is completed by testing whether the optimal predecessor of the candidate step does not precede the earliest predecessor of the target step.

12. The computer-readable storage medium of claim 11, wherein precalculating the earliest predecessor step and the earliest breakpoint setting comprise the steps of maintaining a table mapping breakpoint settings to steps of the execution, the table initially set to the empty table, and a current step, initially set to the initial step of the execution, and repeatedly: calculating a set of breakpoint settings that would cause execution to break at the current step; setting the earliest predecessor of the current step to be the step immediately preceding the current step; for each breakpoint setting in the set of breakpoint settings, looking up the breakpoint setting in the table; if the table maps the breakpoint setting to an earlier step that precedes the earliest predecessor of the current step, setting the earliest predecessor of the current step to be the earlier step, and setting the earliest breakpoint setting of the current step to be the breakpoint setting; modifying the table to map the breakpoint setting to the current step; and completing the precalculation if the current step is the last step of the execution, and otherwise setting the current step to be the step of the execution that immediately follows the current step.

* * * * *

UNITED STATES PATENT AND TRADEMARK OFFICE
CERTIFICATE OF CORRECTION

| | | |
|---|---|---|
| PATENT NO. | : 7,644,396 B2 | Page 1 of 1 |
| APPLICATION NO. | : 11/288520 | |
| DATED | : January 5, 2010 | |
| INVENTOR(S) | : Ernest S. Cohen | |

It is certified that error appears in the above-identified patent and that said Letters Patent is hereby corrected as shown below:

In column 9, line 22, in Claim 1, delete "staffed" and insert -- started --, therefor.

In column 9, line 25, in Claim 1, delete "staffed" and insert -- started --, therefor.

In column 11, line 14, in Claim 10, delete "staffed" and insert -- started --, therefor.

In column 11, line 17, in Claim 10, delete "staffed" and insert -- started --, therefor.

Signed and Sealed this
Third Day of May, 2011

David J. Kappos
*Director of the United States Patent and Trademark Office*